United States Patent [19]

Brown, III et al.

[11] Patent Number: 5,050,098

[45] Date of Patent: Sep. 17, 1991

[54] PRINTER INITIALIZATION SYSTEM

[75] Inventors: John K. Brown, III; James C. Buchanan; Carl P. Cole; Patrick O. Bischel, all of Lexington, Ky.

[73] Assignee: Lexmark International, Inc., Greenwich, Conn.

[21] Appl. No.: 398,872

[22] Filed: Aug. 25, 1989

[51] Int. Cl.[5] .............................................. G06F 15/20
[52] U.S. Cl. ................................................. 364/519
[58] Field of Search ........................ 364/518, 519, 521

[56] References Cited

U.S. PATENT DOCUMENTS

| 4,642,792 | 2/1987  | Clements et al. | 364/900 |
| 4,648,047 | 3/1987  | Berkland et al. | 364/519 |
| 4,698,755 | 10/1987 | Okazaki et al.  | 364/519 |
| 4,975,858 | 12/1990 | Ikenoue et al.  | 364/519 |

Primary Examiner—Heather R. Herndon
Attorney, Agent, or Firm—John J. McArdle, Jr.; Charles E. Rohrer

[57] ABSTRACT

A printer control system which enables the using application program to automatically selectively alter printer default parameters, to automatically selectively delete previously downloaded fonts and macros, and to enable the printer to operate from one of several datastream formats. The system allows the printer to initialize default parameters for a succeeding job during the printing of a current job as long as the datastream format is unchanged, and allows the deletion of downloaded fonts as long as they are not needed for the current or future pages being printed for the current job.

3 Claims, 4 Drawing Sheets

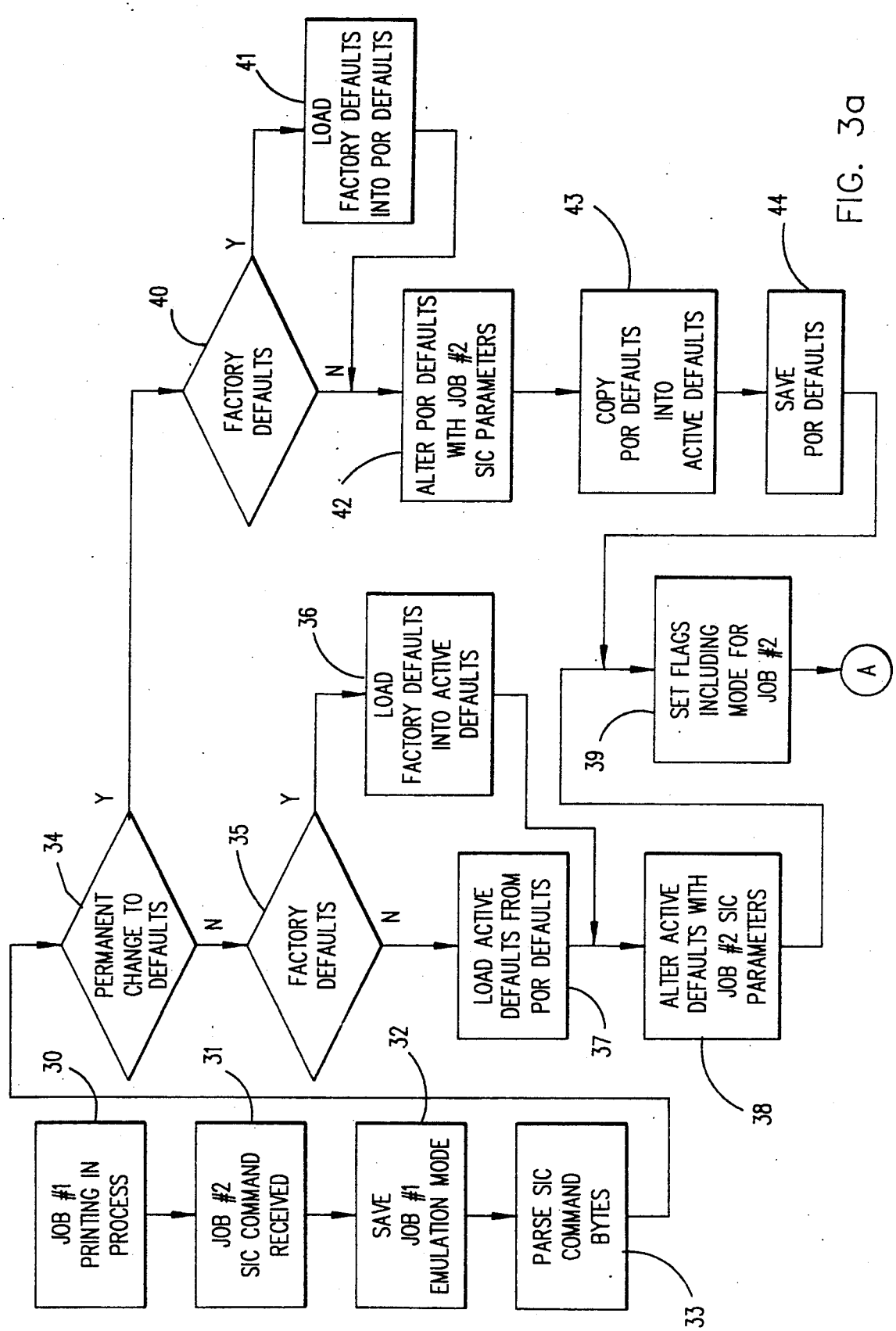

PRINTER INITIALIZATION SYSTEM

FIELD OF THE INVENTION

This invention relates to a printer control system and more particularly to a printer initializing procedure which provides the using application program with control over printer default parameters, with control over previously downloaded fonts and the ability to select datastream format.

BACKGROUND OF THE INVENTION

Printers for providing visual output from computing systems may be comprised of impact printers of several different varieties as well as non-impact printers such as a laser printer. Output printers may have all points addressable (APA) capability in order to provide high quality graphics and image reproduction as well as text reproduction. Recent years have seen the introduction of advanced function intelligent page printers which are capable of organizing a page to be printed from transmitted commands and vector information far more condensed than a page bit map. As a consequence, the speed with which jobs are processed are more and more bound by the speed of the printer itself and less bound by the data transmission from the host computing system.

Output printers are frequently attached in a local area network or other transmission system where several computers use a single output printer. In such systems, it is increasingly common to encounter users with several different datastreams. In such case, it is desirable to provide an output printer with the capability of receiving print jobs and being able to process those jobs from a variety of datastreams. In any event, a printer with multiple datastream capability is usable in a larger number of environments. It is desirable for such a printer to accept different datastream transmission at the request of the using application without the need for physical intervention at the printer itself.

It is, therefore, an object of this invention to provide an initializing procedure for a page printer that will enable the printer to accept one of a variety of datastreams at the command of the application.

It is another object of this invention to provide an initializing processor which will enable the application to alter printer default parameters so that physical intervention at the printer itself is not necessary.

It is still another object of this invention to enable the printer set-up to be accomplished while the preceding job is still being printed so that one or more pages of the succeeding job can be transmitted to the printer and placed in the ready state to activate the printer as soon a the preceding job is finished.

It is still another object of the invention to enable the application to selectively delete either temporarily or permanently downloaded fonts and macros in order to free machine memory for the job at hand.

It is still another object of the invention to enable the application to alter printer default parameters permanently as well as temporarily.

It is an object of the invention to enable the application to establish a personalized job environment and to return the printer to a known installation environment at job conclusion.

SUMMARY OF THE INVENTION

This invention is an initializing procedure for a printer wherein a host application is enabled to present initializing instructions to automatically set up the printer. Through the initializing procedure, the application can selectively alter printer default parameters either temporarily or permanently. It can selectively delete previously downloaded temporary or permanent fonts and macros and it can select one of several printer emulation modes so that the printer is enabled to process the selected datastream format. Additionally, the initializing procedure can be carried out while a preceding job is still being printed as long as the emulation mode is unchanged and as long as fonts needed for the job being printed are not deleted.

BRIEF DESCRIPTION OF THE DRAWINGS

The above mentioned and other features and objects of this invention and the manner of attaining them will become more apparent and the invention itself will best be understood by reference to the following description of embodiments of the invention taken in conjunction with the accompanying drawing the description of which follows.

FIGS. 3a and 3b are more detailed flowcharts showing the steps of the process for setting the initial conditions selected by the application.

DETAILED DESCRIPTION OF A PREFERRED EMBODIMENT

Figure 1:
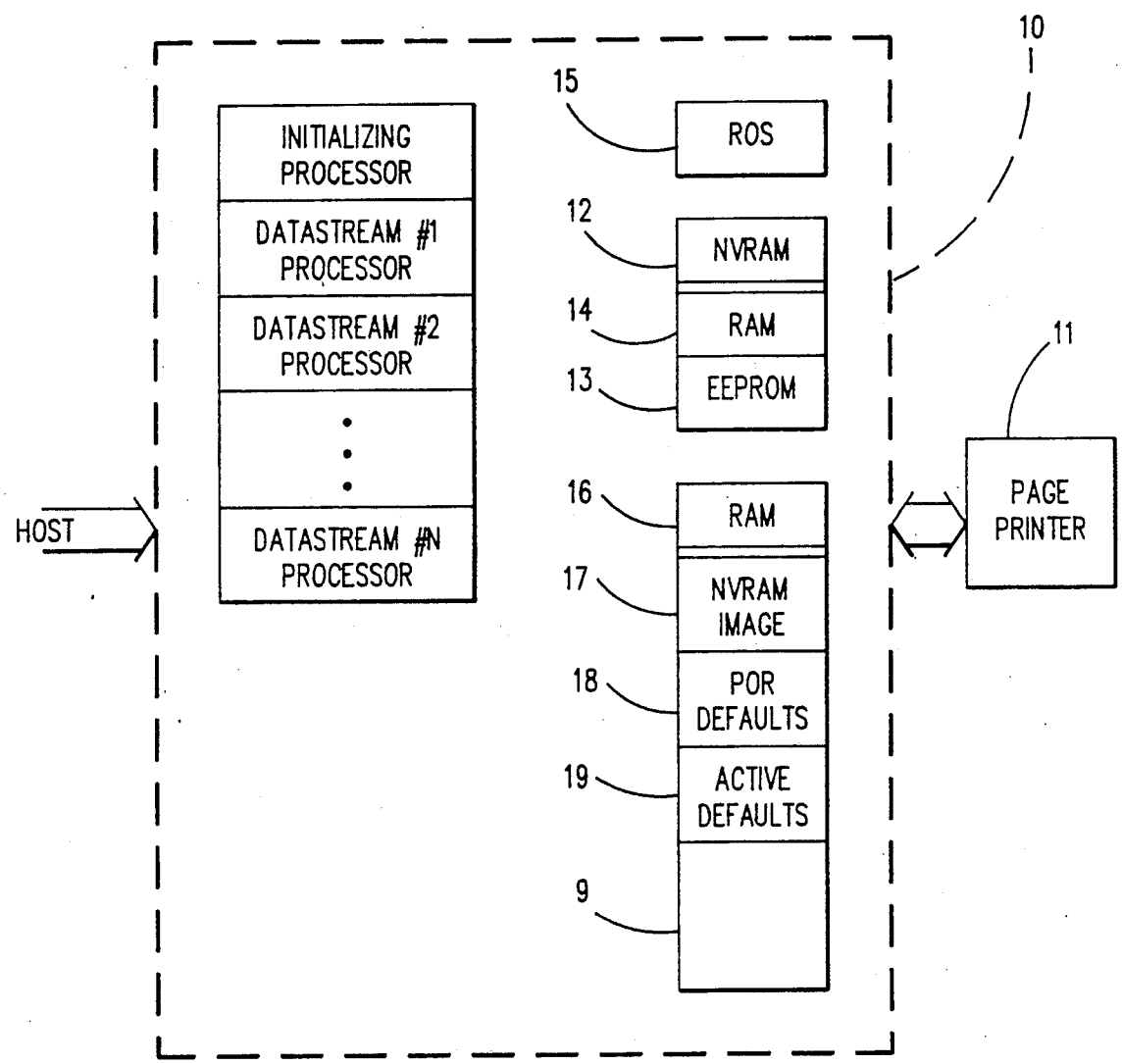
FIG. 1 shows particular elements of a control unit for a page printer.

FIG. 1 shows a control unit 10 for receiving a datastream from a host application which is resident on a computing system (not shown) attached to the control unit. Control unit 10 is also connected to a page printer 11 which may be an all points addressable laser printer or any other type of page printer.

Control unit 10 contains all of those processing and memory elements which are necessary to interact with the commands received from the application and provide data in a format acceptable to the particular page printer to which it is connected. For example, data from the host connection is manipulated and saved in an area of printer memory known as a page buffer. Second, the contents of the page buffer are rasterized into an image of a page to be printed and stored in either a partial page or a full page bit map memory. Third, the data from the bit map memory is serialized and sent to the print engine for printing. In a laser printer, for example, the data from a bit map is used to modulate the laser as the laser beam is swept across a photoconductor.

The particular elements of control unit 10 which are important in the initializing procedure of this invention are shown in FIG. 1. One of these components is nonvolatile random access memory (NVRAM) 12, which is used in order to retain printer default parameters across power cycles or during times of interruption of power to the system. Memory 12 typically includes a portion which is an erasable electrically programmable read-only-memory (EEPROM) 13, and a portion which is a random access memory (RAM) 14, used for transferring data to and from the EEPROM.

The control unit 10 also contains a read only storage (ROS) 15 and a random access memory (RAM) 16. A designated portion of random access memory is set aside to incorporate an image 17 of NVRAM, a power-on reset version of NVRAM (POR defaults) 18, and a designated active defaults area 19. RAM portion 9 is that area used for many functions such as the page buffer and bit map memory mentioned above. The processing portion of the control unit includes processors for the various datastreams which are acceptable to the page printer 11.

Many page printers are designed with features that are very useful for some jobs, but not so useful for others. For example, some printers have the capability of printing on either one or two sides of print paper. Many printers have more than one paper drawer from which print paper may be selected. Different size paper, for example, may be placed in the different paper drawers. Many printers have the capability of printing either in a portrait orientation or in a landscape orientation. Still other printers have a special source for feeding envelopes automatically and/or manually. In the case of the printer of the preferred embodiment of this invention, an additional capability is the selection of one of several datastream formats. Whatever the options available on a page printer, there are default conditions which will establish the printer set-up when the application does not indicate a preferred set-up.

In the printer of the preferred embodiment, default conditions established by the factory are incorporated into a designated area of read only storage 15. On its first use, the printer will initialize the EEPROM area 13 of NVRAM 12 to contain the factory default conditions. Thereafter in the use of the printer, the default conditions stored in NVRAM 12 will be the conditions setting up the printer. Over the course of time, these default parameters may be changed by using applications such that the NVRAM default conditions are not the same as the factory default conditions contained in memory 15. These changes are accomplished through an initializing procedure which works from a set initial conditions (SIC) command. The SIC command is used by the application to temporarily or permanently alter the default conditions located in active defaults 19. If a permanent alteration is intended, POR defaults 18 will also be altered and ultimately NVRAM 12 itself will be altered.

In addition to enabling a permanent or temporary alteration of the defaults, the SIC command also allows for selectively deleting downloaded fonts and macros. Certain other fonts are contained in read only storage and cannot be deleted or changed. In addition, extra fonts can be stored on detachable read only memory cards and these also cannot be changed. However, a large number of fonts can be downloaded from the host to the printer and can be stored either permanently or temporarily in random access memory 9. These fonts can be selectively deleted at any time through the use of this invention, that is, either all temporary fonts or all permanent fonts can be deleted through the use of the SIC command.

Macros, which are stored datastreams in the printer, enable the application to accomplish an objective such as setting up a page with the origins, the margins, the logo, etc. Macros are stored in the printer so that they may be called by successive users. In that manner, the using applications can avoid continually transmitting the same succession of commands on a succession of jobs. The SIC command enables the selective deletion of these macros.

The SIC command is also the medium through which the user is enabled to change from one datastream to another, that is to change the emulation mode of the printer. For example, if the user wishes to utilize the printer in an ASCII based mode, Personal Printer Datastream (PPDS), or an alternate datastream mode, the SIC command enables that change.

The format of the set initial conditions (SIC) instruction follows as written in BASIC. The first three bytes define the command while the next two bytes specify the number of parameter bytes in the command. The parameter bytes then follow.

SET INITIAL CONDITIONS (SIC)
   CHR$(27);CHR$(91);CHR$(75);CHR$(CNTL);CHR$(CNTH);
   CHR$(INIT);
   CHR$(OptionalParameters);

SIC causes the printer active functional environment to be reset to an initial state based on the value of the INIT parameter and the presence or absence of the optional parameters. Page data which has not been released to be printed is released before the printer is initialized.

In this embodiment, the command is valid in the PPDS datastream mode and also in Alternate and Plotter datastream modes. The command can be extended to other datastream modes, as desired.

In all cases, the host communications attachment selection and associated communications parameters are not changed by the SIC command when restoring the printer to the NVRAM/permanent or factory defaults.

INIT Parameter: The INIT parameter is a one-byte hexadecimal value that specifies how the printer is to be initialized.

| | |
|---|---|
| X'00' | The printer is initialized based on the permanent default settings stored in NVRAM and the merger of the optional parameters if present in the SIC command. All permanent downloaded fonts and macros are retained. Temporary fonts and macros are deleted. |
| X'01' | The printer is initialized based on the permanent default settings stored in NVRAM and the merger of the optional parameters if present in the SIC command. All permanent and temporary downloaded fonts and macros are deleted. |
| X'02' | Reserved (Defaults to X'00') |
| X'03' | Reserved (Defaults to X'00') |
| X'04' | The printer is initialized based upon the factory default settings and the merger of the optional parameters if present in the SIC command. All permanent downloaded fonts and macros are retained. Temporary fonts and macros are deleted. |
| X'05' | The printer is initialized based upon the factory default settings and the merger of the optional parameters if present in the SIC command. All permanent and temporary downloaded fonts and macros are deleted. |
| X'06' | The printer is initialized based on the settings of the permanent default settings stored in NVRAM and the merger of the optional parameters if present in the SIC command. All permanent and temporary downloaded fonts and macros are retained. |
| X'07' | The printer is initialized based upon the factory default settings and the merger of the optional parameters if present in the SIC command. All permanent and temporary downloaded fonts |

|  |  |
|---|---|
| | and macros are retained. |
| X'FE' | This command is functionally equivalent to X'01' except that the resulting merger of the permanent default settings stored in NVRAM and the optional parameters if present in the SIC command replace the original permanent default values in NVRAM. |
| X'FF' | This command is functionally equivalent to X'05' except that the resulting merger of the factory default settings and the optional parameters if present in the SIC command replace the original permanent default values in NVRAM. |
| X'xx' | Other values are reserved. Unsupported or reserved values are handled as mode x'00'. |

If the mode parameter is not provided a x'00' is assumed.

Optional Parameters:

| Byte | Description of Parameter |
|---|---|
| 1 | Device ID<br>The device ID is used to identify the format of the optional parameters for a particular printer. |
| 2 | Alternate Datastream Selection Setup<br>Eight bit unsigned byte:<br>    1 = Select PPDS Datastream Support and Initial Parameters If Present<br>    2 = Select Alternate Datastream Support and Initial Parameters If Present<br>    3 = Select Plotter Datastream Support and Initial Parameters If Present<br>    xx = Invalid Value Causes Parameters To Be Ignored |

Note:
If an alternate datastream selection results in a change in the currently active data stream selection, then all fonts and macros are deleted independent of the disposition indicated by the INIT parameter.

PPDS Datastream Parameters

| Byte | Description of Parameter | |
|---|---|---|
| 3 | Bit Encoded Control Byte<br>76543210 | |
| |        Esc + @ Command Parse | Esc = Escape |
| |        0 . . Parse as three 3 bytes | |
| |        1 . . Parse as 2 bytes | |
| |        Default Line Spacing | |
| |        0 . . 6LPI | |
| |        1 . . 8LPI | |
| |        Character Set Default | |
| |        0 . . . Character Set 1 | |
| |        1 . . . Character Set 2 | |
| |        LF after CR Default | |
| |        0 . . . No LF after CR | CR = Carrier Return |
| |        1 . . . LF after CR | LF = Line Feed |
| |        Coordinate System Origin | |
| |        0 . . . . Physical (At Print Borders) | |
| |        1 . . . . Logical (At Paper Edge) | |
| |    X . . . Not Used | |
| |        Process/Ignore Parameter Byte | |
| |        0 . . . . . Ignore this parameter | |
| |        1 . . . . . Process this parameter | |
| 4 | Select Font Default Font<br>76543210 | |
| |        Font Status Error Handling Initial Setting | |
| |        0 . . Stop on Font Intervention | |
| |        1 . . Continue on Font Intervention | |
| |    xxxx   Ignored | |
| |        Font Source | |
| |        00 . . . . Download | |
| |        01 . . . . Internal | |
| |        10 . . . . Card-1 | |
| |        11 . . . . Card-2 | |
| |        0 . . . . . Ignore this parameter | |
| |        1 . . . . . Process this parameter | |
| 5 | PPDS Font Position<br>76543210<br>xxxxxxxx 1-99 Font Position Number<br>00000000 Ignore this parameter<br>       100-255 Values are Ignored<br>If the designated font is not accessible or an unsupported value is specified then Courier 10 / 437 is selected. | |

The following bytes are associated with orientation, tray renumber, default paper source, INIT* parallel interface signal, and default paper sizes by paper source. Upon completion of the SIC command, the printer's active operating environment is set based on these values except for tray renumber and parallel INIT* interface signal. These parameters are only processed for SIC INIT parameter values of X'FE' and X'FF'.

The following bytes are shared by the printer for all datastream modes. Changing these bytes effects the same change in all datastream modes.

| Byte | Description of Parameter |
|---|---|
| 6 | Bit Encoded Control Byte |

-continued

| Byte | Description of Parameter |
|---|---|
| | 76543210 |
| |     Orientation |
| |       0 . . Portrait |
| |       1 . . Landscape |
| |    Tray Renumber |
| |       0 . . Tray-1 = Upper Tray (Standard Tray) |
| |             Tray-2 = Lower Tray (Optional Tray) |
| |       1 . . Tray-1 = Lower Tray (Optional Tray) |
| |             Tray-2 = Upper Tray (Standard Tray) |
| |       If the optional paper tray feature |
| |       is not installed then the standard |
| |       tray is assumed to be tray one. |
| |    x    Not Used (Ignored) |
| |    Default Paper Source |
| |       000 . . . Manual Paper Insert |
| |       001 . . . Tray-1 |
| |       010 . . . Tray-2 |
| |       011 . . . Envelope (optional envelope feeder) |
| |       100 . . . Manual Envelope Feed |
| |       xxx . . . Other values result in no change |
| |             (Independent of tray renumber) |
| |       If the selected optional paper feeder |
| |       source is not installed then the |
| |       standard paper tray is used. |
| |    Interface INIT* Signal |
| |       0 . . . . . Honor INIT* Interface Signal |
| |       1 . . . . . Ignore INIT* Interface Signal |
| |    Process/Ignore Parameter Byte |
| |       0 . . . . . Ignore this parameter |
| |       1 . . . . . Process this parameter |
| 7 | Manual Paper Size Selection |
| | 76543210 |
| |    xxxxxxxx Manual Feed Paper Size ID |
| |    00000000 Ignore this parameter |
| |             Unsupported values result in no change |
| 8 | Tray-1 Default Paper Size Selection |
| | 76543210 |
| |    xxxxxxxx Tray-1 Size ID |
| |    00000000 Ignore this parameter |
| |             Unsupported values result in no change |
| 9 | Tray-2 Default Paper Size Selection |
| | 76543210 |
| |    xxxxxxxx Tray-2 Size ID |
| |    00000000 Ignore this parameter |
| |             Unsupported values result in no change |
| 10 | Auto Envelope Size Selection |
| | 76543210 |
| |    xxxxxxxx Auto Envelope Size ID |
| |    00000000 Ignore this parameter |
| 11 | Manual Envelope Size Selection |
| | 76543210 |
| |    xxxxxxxx Manual Envelope Size ID |
| |    00000000 Ignore this parameter |
| |             Unsupported values result in no change |
| |             Unsupported values result in no change |

Alternate Datastream Parameters

| Byte | Description of Parameter |
|---|---|
| 3 | Alternate Datastream Font Source Default |
| | 76543210 |
| |           Font Source |
| |    00      Download |
| |    01      Internal |
| |    10      Card-1 |
| |    11      Card-2 |
| |    xxxxx  These bits are ignored |
| |       0 . . . . . Ignore this parameter |
| |       1 . . . . . Process this parameter |
| |    If the designated font is not accessible then |
| |    Courier 10 / Roman-8 is selected. |
| 4 | Alternate Datastream Font Position |
| | 76543210 |
| |    xxxxxxxx 1-99 Font Position Number |
| |    00000000 Ignore this parameter |
| |             100-255 Values are Ignored |
| | If the designated font is not accessible or |

-continued

| Byte | Description of Parameter |
|---|---|
| | an unsupported value is specified then |
| | Courier 10 / Roman-8 is selected. |
| 5-6 | Alternate Datastream Form Length |
| |    xxxxxxxx xxxxxxxx An unsigned integer value |
| |                            which specifies the VMI used |
| |                            of 1/3600 inches |
| |    00000000 00000000 Ignore this parameter |
| |                            Invalid VMI values are ignored. |
| 7-8 | Alternate Datastream Symbol Set |
| |    xxxxxxxx xxxxxxxx An unsigned integer value |
| |                            which specifies the alternate data |
| |                            stream Character Set. Value is |
| |                            calculated in the same manner as |
| |                            the download symbol set |
| |                            parameter. |
| |    00000000 00000000 Ignore this parameter |
| |                            A Parameter value outside of the |
| |                            valid range is ignored. |
| |                            If the designated Symbol Set is |
| |                            not available then Roman-8 is |
| |                            selected. |
| Bytes 9-14 are the same as bytes 6-11 previously described for the PPDS datastream. | |

Plotter Parameters

The following setup parameters are used to establish the power-on reset (POR) defaults for the plotter datastream.

| Byte | |
|---|---|
| 3 | Bit Encoded Change Control Byte |
| | 76543210 |
| |    Color Simulation |
| |       0 . . Off |
| |       1 . . On |
| |    Enhanced Mode |
| |       0 . . Off |
| |       1 . . On |
| |    B-Size Paper Simulation |
| |       0 . . . Off |
| |       1 . . . On |
| |    xxxx . . . Not Used |
| |    Process/Ignore Parameter Byte |
| |       0 . . . . . Ignore this parameter |
| |       1 . . . . . Process this parameter |
| Bytes 4-9 are the same as bytes 6-11 previously described for the PPDS datastream. | |

Figure 2:
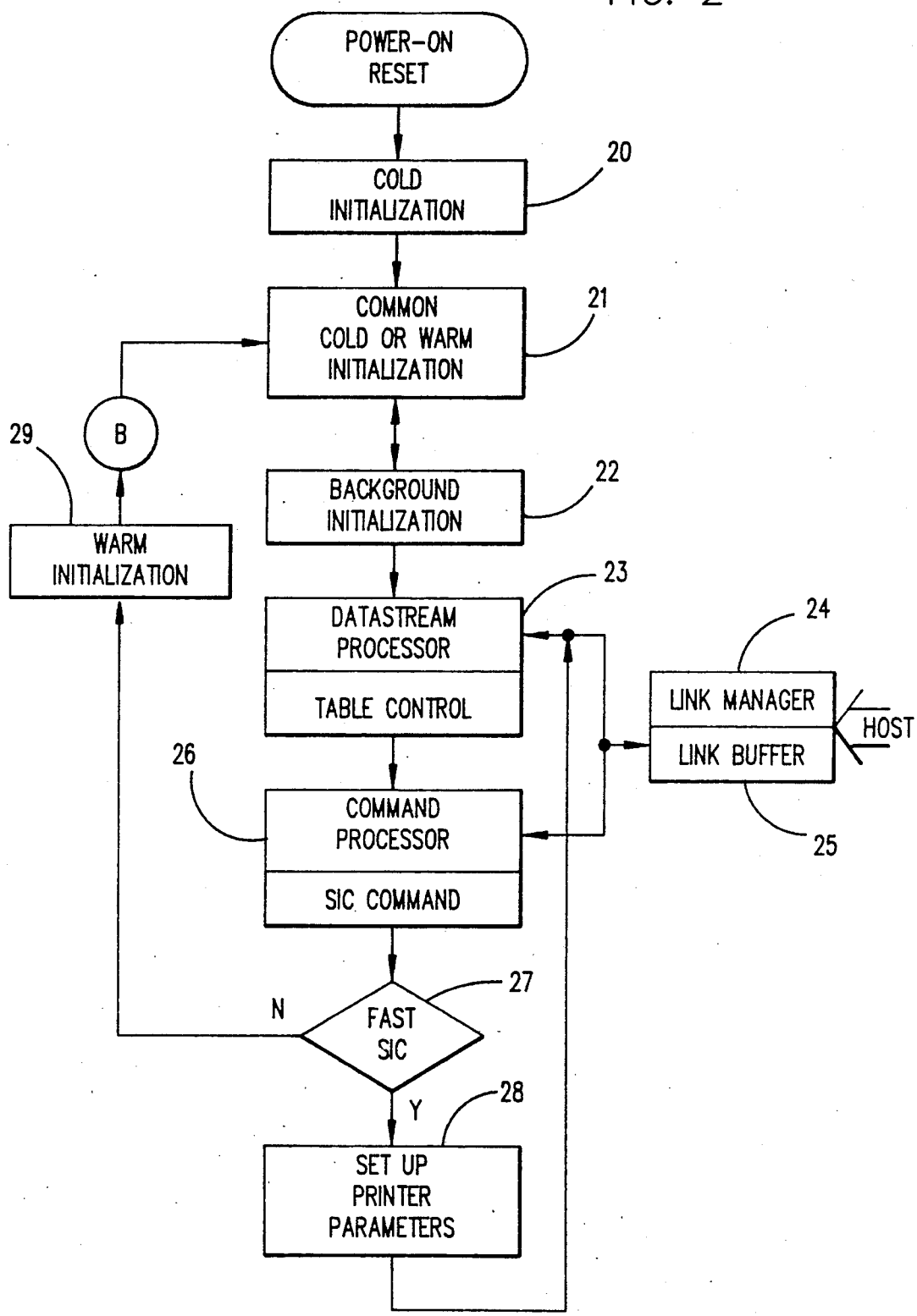
FIG. 2 is a flowchart showing the steps of the page printer system initialization process.

FIGS. 2 and 3 show a currently preferred embodiment for the initializing procedure of the invention. In FIG. 2, after a power-on reset (POR), a cold initialization module 20 is entered. Some of the functions performed at this time include a basic assurance test that the components of the printer are operating properly. Cold initialization clears all of RAM memory and initializes the hardware. Steps performed by the common module 21 include calling all of the various sub-system initialization modules. These modules process flags in RAM which at cold initialization time will all be zero. Some of the sub-systems initialized at this time include the font manager, the macro manager, the NVRAM manager, the memory manager, the front panel manager and the link manager. As an example of sub-system initialization activity, the NVRAM manager initializes NVRAM image area 17, POR defaults area 18 and active defaults area 19. Finally, the common initialization module jumps to the background initialization module 22 which determines whether any special functions have been set-up on the front panel of the machine and then processes those front panel requests. Front panel requests are made from switches on the printer machine itself which are physically set to call for special functions. For example, such requests might include printing in hexadecimal or doing a print test. If a special function is not requested, the background initialization module calls the initialization mode for the particular emulation mode requested, after which control is released to that particular emulation manager (datastream processor). The factory default emulation manager (datastream processor) is that processor for the PPDS datastream. The table control portion of the datastream processor 23 will operate a continuous loop to continually check for data in the link buffer 25. That is, it makes a continual check of the link buffer 25 to see if information has been received from the host and deposited into the link buffer by the link manager 24.

When information in link buffer 25 is available to the datastream processor 23, the command is parsed in order to determine which command processor needs to receive the data. Should a SIC command be present, the datastream processor will turn control over to the SIC command processor 26. SIC command processor 26 will continue to inspect the link buffer 25 until all data necessary for processing the initialization function is at hand. A determination is made at decision step 27 to determine whether the initialization can be accomplished rapidly, and if so, the printer parameters are set up as shown at step 28. Once accomplished, control is returned to the datastream processor 23 where the fast SIC is recognized and a return is made to the background initialization module for the functions described above, after which datastream processor 23 acts to process commands and data received from the host and deposited in link buffer 25. Should a fast initialization not be possible, the process waits until all pages in a preceding job are printed, then a branch is made to a warm initialization routine 29. When that occurs, resettable RAM is cleared and the common module 21 is called in order to perform those functions which have been previously described. The procedure continues as already described until the datastream processor 23 regains control and is in communication with the link buffer 25.

Figure 3B:
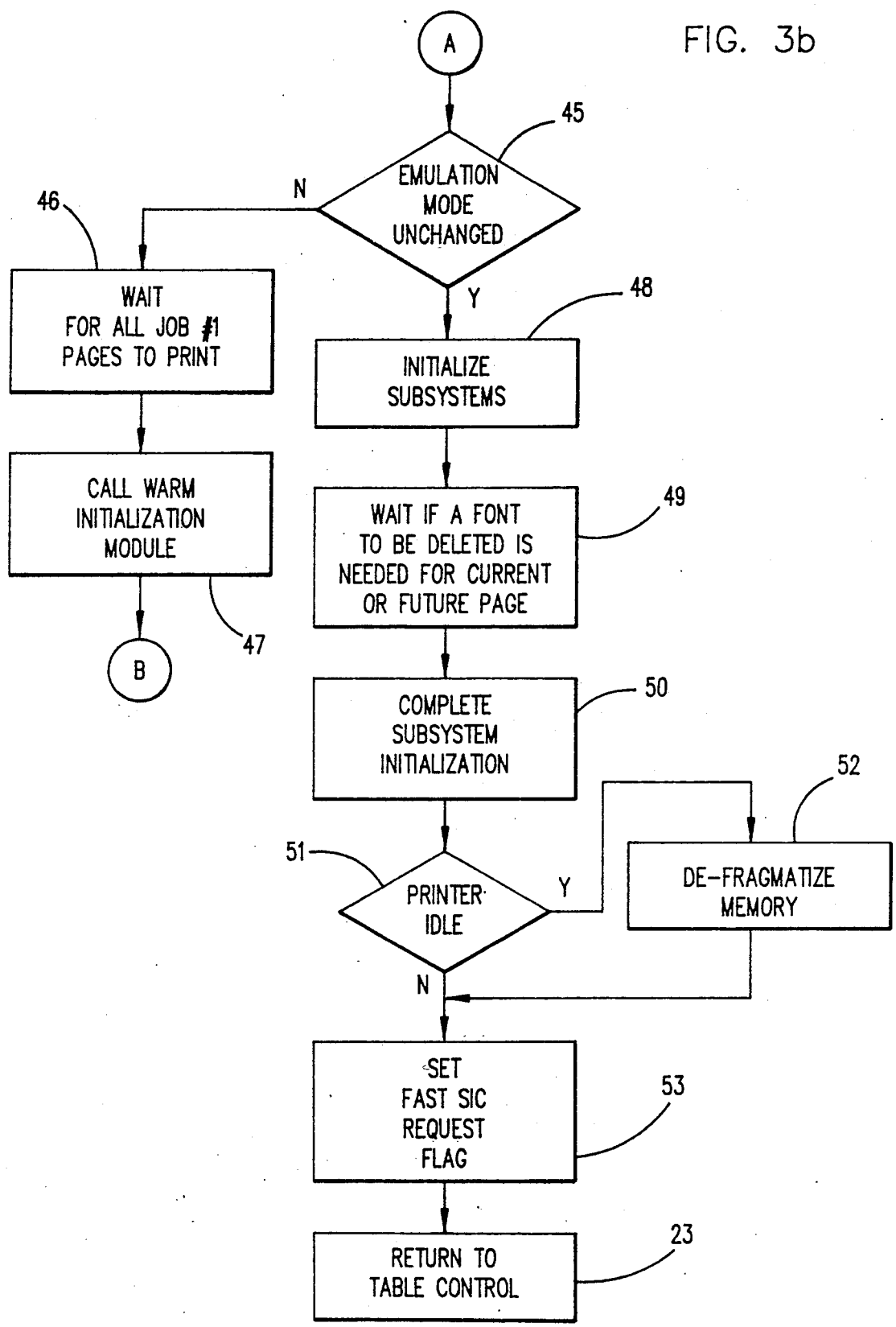

FIGS. 3a and 3b show the steps performed in the SIC command processor 26 when the printer is already printing some other preceding job. That is, FIG. 3a shows at 30 that Job #1 printing is in process and at 31 that a SIC command has been received for initializing the printer for Job #2. In such an instance, the first step 32 is to save the emulation mode for Job #1. Next, at step 33, the SIC command for Job #2 is parsed. At step 34, the parsed command bytes are inspected to determine whether a permanent change is to be made to the printer default parameters contained in NVRAM. If no permanent change is to be made, a branch is made to step 35 in order to inquire whether the Job #2 SIC command is calling for the use of factory defaults. If it is, the factory defaults are loaded into active defaults at step 36. As mentioned previously, the factory defaults are located in read only storage 15. Therefore, this step calls for writing the factory defaults from memory 15 into the active defaults area 19. Should factory defaults not be indicated, the next step 37 calls for loading active defaults area 19 from POR defaults area 18. In either case, step 38 is performed in order to alter active defaults area 19 with Job #2 SIC parameters. That is to say, if step 36 were performed, then the factory defaults would be utilized except for those defaults which are changed by the Job #2 SIC command. Should the application call for the use of those parameters which have been stored in NVRAM (step 37), then those parameters will be used together with any alterations indicated by the Job #2 SIC command. At this point, the printer default parameters have been organized according to the requirements of Job #2 and flags are set at step 39 indicating those conditions.

Returning to step 34, if a permanent change to the NVRAM default parameters is indicated by the parsing of the Job #2 SIC command, a branch is made to step 40 in order to determine whether the permanent change will call for the use of factory default conditions. If it does, then factory defaults will be loaded into POR NVRAM at step 41. In any case, POR defaults area 18 (FIG. 1) will be altered at step 42 with those parameters included with Job #2. At step 43, POR defaults are copied into active defaults and at step 44 these parameters are saved in NVRAM. In that manner, a permanent change is made to NVRAM parameters. Next, at step 39, flags are set indicating that the default parameters have been established.

The next step, step 45, shown on FIG. 3b calls for an inspection of the emulation mode to determine whether the Job #2 emulation mode (datastream) is the same as that for Job #1. Should the emulation mode be changed, that is should the datastream change, it is necessary to wait for all Job #1 pages to finish printing as shown at step 46. Once that is accomplished, then the warm initialization module is called at step 47 and a jump is made to the common initialization module 21 as shown at B on FIG. 2. The initialization procedure then continues as previously described with respect to FIG. 2.

However, should the emulation mode for Job #2 be the same as that for Job #1, a branch is made to step 48 where many of the various sub-systems associated with the control unit 10 are initialized. One of the sub-systems which is called for initialization is the font manager. If the font manager determines that Job #1, which is still printing, is using a font that is to be deleted by Job #2, then the initialization procedure is halted until all pages calling for the font to be deleted have been printed. At that point, the font manager deletes the font. When all fonts to be deleted have been processed, the initialization of the machine continues as shown at step 50. Should the printer be idle at this point as shown at step 51, it is possible for the memory manager to be called in order to defragmentize the memory in the machine as shown at step 52. In any case, step 53 is performed calling for setting the fast SIC request flag before returning to the datastream processor table control. When table control receives control back, the fast SIC request flag is examined. If a fast SIC is requested, control is returned to the background initialization module for reinitialization work, after which control is returned to the datastream processor. In this manner, the machine is initialized for Job #2 while Job #1 is still printing. Once initialized, table control operates to inspect the link buffer for commands and data sent down from the host by Job #2. In this manner, pages of data to be printed can be received and made ready to print while still printing Job #1. Obviously, significant efficiency advantages in printer use may thusly be obtained.

While the invention has been particularly shown and described with reference to a preferred embodiment thereof, it will be understood by those skilled in the art that changes in form and details may be made without departing from the spirit and scope of the invention.

What is claimed is:

1. A printer having means for utilizing an initializing procedure wherein the printer is connected with a host application and wherein said host application is operable to present initializing instructions to said printer to automatically set up said printer, said means for utilizing an initializing procedure comprising:

means for selectively altering printer default parameters;

means for selectively deleting previously downloaded fonts and macros;

means for selecting one of several printer emulation modes so that the printer is enabled to process a datastream format associated with the selected printer emulation mode; and said means for utilizing an initializing procedure being operable for a subsequent job while a preceding job is still being printed, as long as the previously selected emulation mode is unchanged for the subsequent job and as long as fonts needed for the job being printed are not deleted until the font is no longer needed, thus enabling said printer to process commands and data for said subsequent job while still printing said preceding job.

2. A printer having means for utilizing an initializing procedure wherein the printer is connected with a host application and wherein said host application is operable to present initializing instructions to said printer to automatically set up said printer, said means for utilizing an initializing procedure comprising:

means for selectively altering printer default parameters;

means for selectively deleting previously downloaded fonts and macros;

means for selecting one of several printer emulation modes so that the printer is enabled to process a datastream format associated with the selected printer emulation mode; and the printer further including a random access memory and a non-volatile random access memory each having designated areas for storage of different default parameters and wherein the means for selectively altering printer default parameters further includes:

means for parsing initialization command bytes;

operable if a permanent change in default parameters is indicated, means for loading the indicated default parameters into the designated random access memory area;

means for altering those parameters with job parameters;

means for loading the altered memory area into the non-volatile random access memory in an area corresponding to the designated random access memory area for keeping the altered default parameters; and means for subsequently processing datastream commands.

3. The printer of claim 2 where said means for utilizing an initialization procedure is operable for a subsequent job while a preceding job is still being printed as long as the previously selected emulation mode is unchanged for the subsequent job and as long as fonts needed for the job being printed are not deleted until the font is no longer needed, thus enabling said printer to process commands and data for said subsequent job while said preceding job is still being printed.

* * * * *